United States Patent [19]
Johnson

[11] Patent Number: 5,897,083
[45] Date of Patent: Apr. 27, 1999

[54] RETAINER FOR RECREATIONAL VEHICLE SEWER HOSE

[76] Inventor: Albert P. Johnson, 71 Lora Way, Roseville, Calif. 95661

[21] Appl. No.: 09/005,942

[22] Filed: Jan. 12, 1998

[51] Int. Cl.⁶ .............................. A62C 13/76; F16L 3/00
[52] U.S. Cl. .......................... 248/75; 248/49; 138/109; 138/155; 138/118
[58] Field of Search .................. 248/75, 49, 60; 285/55, 115, 226; 138/111, 114, 109, 118, 155

[56] References Cited

U.S. PATENT DOCUMENTS

| | | | |
|---|---|---|---|
| 3,819,137 | 6/1974 | Smith | 248/60 X |
| 4,102,523 | 7/1978 | Finnell | 248/49 |
| 4,173,989 | 11/1979 | Prest | 138/109 |
| 4,228,978 | 10/1980 | Rand | 248/49 |
| 4,712,755 | 12/1987 | Robbins et al. | 248/49 |
| 4,854,349 | 8/1989 | Foreman | 138/89 |
| 4,905,939 | 3/1990 | Horn | 248/49 |
| 5,023,959 | 6/1991 | Mercer | 138/109 X |
| 5,067,679 | 11/1991 | Courtney | 248/75 |
| 5,226,456 | 7/1993 | Semak | 248/49 X |
| 5,323,813 | 6/1994 | Barrett | 138/155 X |
| 5,573,187 | 11/1996 | Proctor | 138/118 X |

*Primary Examiner*—Ramon O. Ramirez
*Assistant Examiner*—Long Dinh Phan
*Attorney, Agent, or Firm*—Heisler & Associates

[57] ABSTRACT

A retainer (10) for holding and protecting a sewer hose for a recreational vehicle is provided. The retainer (10) has an elongate hollow tubular body portion (20) with a flat base (40) attached to a bottom end (23) of the body portion (20). A cap (50) is removably attachable to a top end (22) of the body portion (20). Drain holes (34) provide for ventilation between a hollow interior region (36) of the body (20) and the environment surrounding the retainer (10). Bores (48), (58) pass through the base (40) and the cap (50) to allow for thorough ventilation of the hollow interior region (36) of the body portion (20). The body portion (20) is provided with a width which is less than a width of the sewer hose (H). The base (40) and removable cap (50) are provided with a width which is greater than a width of the sewer hose (H). Hence, the sewer hose (H), when it is located upon the body portion (20) of the retainer (10), is prevented from falling off of the body portion (20). Ventilation is provided for an interior of the sewer hose (H) through the drain holes (34) and through the bores (48), (58).

20 Claims, 3 Drawing Sheets

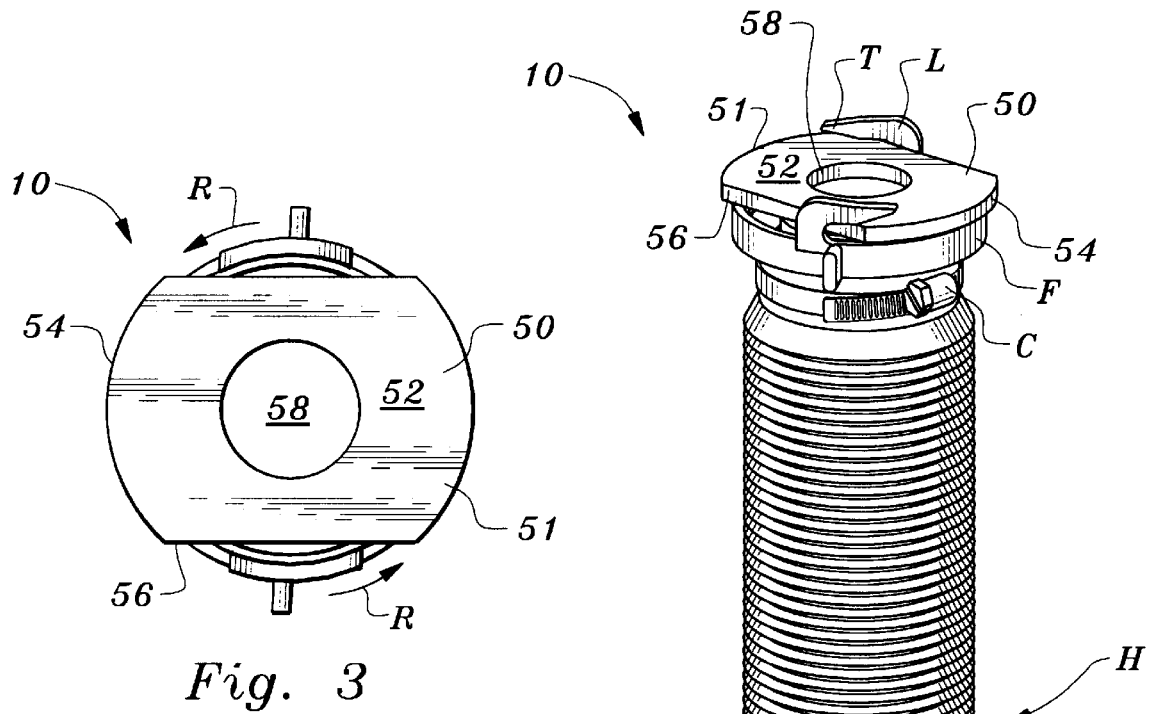
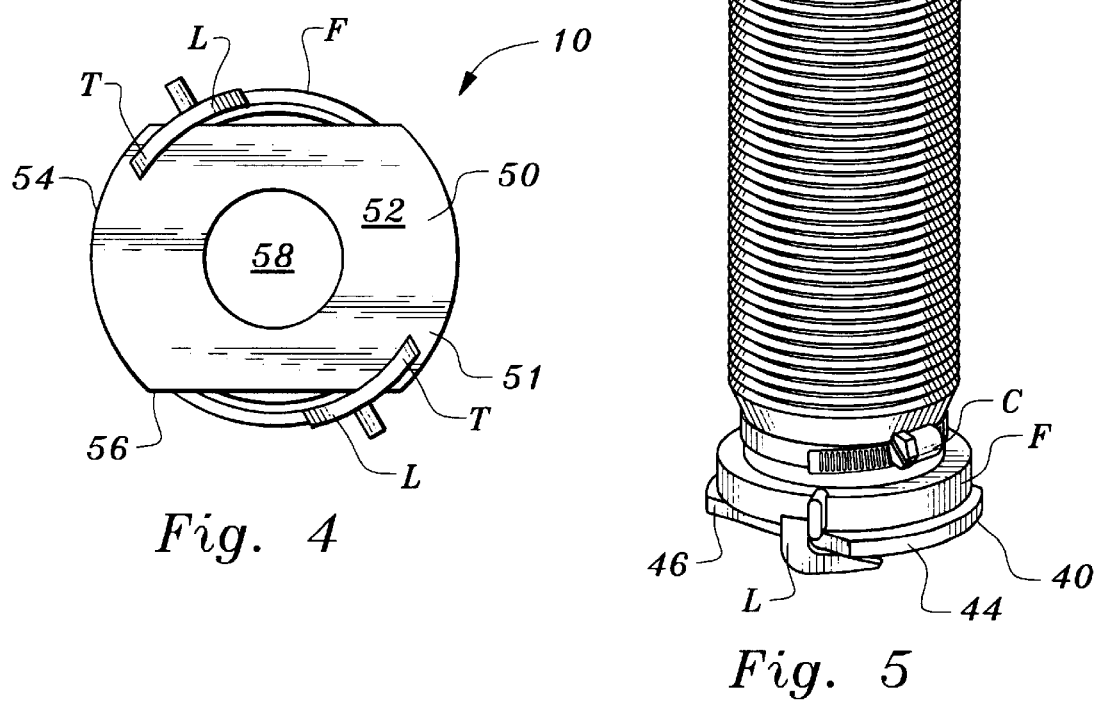

RETAINER FOR RECREATIONAL VEHICLE SEWER HOSE

FIELD OF THE INVENTION

This invention relates to systems and devices for storing and protecting elongate flexible sewer hoses such as those used by recreational vehicles to deliver sewage into a municipal sewer system. More specifically, this invention relates to retainers which can hold and store the elongate flexible sewer hose in a manner which prevents the sewer hose from being damaged and which allows the sewer hose to be vented for evaporation of moisture collecting within the sewer hose.

BACKGROUND OF THE INVENTION

Recreational vehicles provide many of the comforts of home, including toilet facilities, on a mobile platform to allow vacationers to travel away from home in comfort. One critical system common to all recreational vehicles is a waste disposal system by which the recreational vehicle can be periodically coupled to a municipal sewer system for disposal of wastes collected on the recreational vehicle. Such systems typically include a holding tank on the recreational vehicle and a detachable elongate flexible sewer hose which is attached to the holding tank and then extends away from the recreational vehicle and attaches on an opposite end to the municipal sewer system or other disposal system. Typically such sewer hoses have a three inch diameter and are between ten and twenty feet long when extended. These sewer hoses can be collapsed down to a length less than two feet. It is critical that the sewer hose be maintained in proper working order. A damaged sewer hose can lead to improper disposal of sewage leading to the potential for spread of disease and noxious odors.

One common type of sewer hose attains the desired amount of linear extensibility by having a configuration with a wire extending helically from one of the sewer hose to the other end of the sewer hose with a bellows-type web joining adjacent turns of this helical wire. The bellows material can be formed from a plastic or rubber material having sufficient resiliency to allow the bellows to open and close and the hose in turn to flex and elongate and contract.

While such a configuration does provide the desired elongatability to allow the sewer hose to extend from the recreational vehicle to the disposal site and still be collapsed for storage within the recreational vehicle when not in use, such sewer hoses are susceptible to damage. Most commonly, such sewer hoses are damaged due to rubbing of the hose adjacent surfaces of the recreational vehicle storage space during transport. Such rubbing can cause the wire to be exposed and for holes in the bellows to form such that sewage can leak out of the hose. Additionally, when the wire is exposed it can rust and become weakened, and eventually break or significantly decrease the strength of the sewer hose. Also, it is beneficial to have the sewer hose stored in a fashion which allows the sewer hose to readily dry out between uses to minimize the presence of unpleasant odors and which facilitates ease in handling the sewer hose.

Accordingly, many different systems are known in the prior art for storing a recreational vehicle sewer hose when the sewer hose is not in use. Unfortunately, most prior art sewer hose storage systems have emphasized ease of accessibility to the sewer hose rather than protection of the sewer hose itself and effective ventilation. For instance, one common system utilized for storing a recreational vehicle sewer hose is to provide an elongate tube of square cross-section either attached to a bumper of the recreational vehicle or formed within the bumper itself into which the sewer hose can be placed. Such storage systems are ineffective because the sewer hose is caused to rub against the interior of the storage space when being loaded into the storage space and removed from the storage space and also while the recreational vehicle is traveling over the roads. This rubbing over time causes significant abrasive wear to the sewer hose's outer surface and exposure of the helical wire and other damage to the sewer hose. Additionally, such storage arrangements do not provide effective ventilation for an interior of the sewer hose and encourage the formation of rust in the helical wire forming the sewer hose.

Often recreational vehicle users will merely stuff the sewer hose into a storage locker without necessarily collapsing down the length of the sewer hose. Such a storage technique is particularly difficult to perform, especially when the sewer hose is wet or dirty and causes the sewer hose to contaminate any other articles placed within the storage space. Additionally, the sewer hose still undergoes significant abrasive wear and susceptibility to kinking and other damage to the sewer hose.

Accordingly, a need exists for a retainer for securely holding the sewer hose in a collapsed fashion which does not cause the sewer hose to undergo excessive abrasive wear and which still allows an interior of the sewer hose to be properly ventilated.

SUMMARY OF THE INVENTION

The retainer of this invention includes an elongate body portion with a top end having a base attached thereto and a bottom end which can removably attach to a cap. The body portion has a width which is less than a width of the sewer hose so that the sewer hose can be placed over the body portion. The base and the cap have a width which is greater than the width of the sewer hose so that the sewer hose is restrained from passing off of the body portion and past the base or the cap when the sewer hose is placed onto the body and the cap is attached to the body. Drain holes pass through the body portion and allow an interior of the sewer hose to have access to an interior region within the hollow body portion of the retainer. The base and the cap can be provided with openings which allow for cross ventilation through the base and through the cap by way of the hollow interior region of the body portion. Additionally, the cap and base can be configured so that the retainer can stand on the base and so that locking flanges on ends of the sewer hose can lock with the base and cap so that the sewer hose will not rotate with respect to the retainer, further reducing any abrasive rubbing between the sewer hose and the retainer. The retainer thus provides a secure storage system for the sewer hose to keep the sewer hose in its collapsed form for ease of handling and storage within the recreational vehicle in a manner which minimizes damage to the sewer hose and maximizes convenience for the recreational vehicle user.

OBJECTS OF THE INVENTION

Accordingly, a primary object of the present invention is to provide a retainer for securely holding an elongate flexible recreational vehicle sewer hose in a collapsed form for ease of handling and minimization of wear and other damage to the sewer hose.

Another object of the present invention is to provide a retainer which can hold a sewer hose and simultaneously allow ventilation of an interior of the sewer hose.

Another object of the present invention is to provide a retainer which can hold a sewer hose in a collapsed and secure configuration for handling without rubbing against exterior surfaces of the sewer hose.

Another object of the present invention is to provide a retainer which can hold a sewer hose and can stand on one end for ease of handling of the sewer hose.

Another object of the present invention is to provide a sewer hose retainer which is of simple lightweight durable construction.

Another object of the present invention is to provide a sewer hose retainer which can be easily connected and disconnected from the sewer hose when the sewer hose is to be stored and removed from storage.

Another object of the present invention is to provide a sewer hose retainer which enhances the ability of a recreational vehicle user to handle the sewer hose in a convenient and sanitary manner.

Another object of the present invention is to provide a sewer hose retainer which minimizes damage to the sewer hose when the sewer hose is being stored.

Another object of the present invention is to provide a sewer hose retainer which can hold ends of the sewer hose so that the sewer hose is prevented from rotation relative to the retainer.

Other further objects of the present invention will become apparent from a careful reading of the included drawing figures, the claims and detailed description of the invention.

BRIEF DESCRIPTION OF THE DRAWINGS

FIG. 3 is a top plan view of that which is shown in FIG. 5 revealing how the sewer hose can be rotated to cause locking flanges on the sewer hose to engage the cap and be secured from rotation relative to the retainer.

FIG. 4 is a top plan view similar to that which is shown in FIG. 3 after rotation of the sewer hose to lock the sewer hose in position relative to the retainer.

FIG. 5 is a perspective view of the sewer hose retainer of this invention with the sewer hose attached to the retainer and with locking flanges of the sewer hose locked to the retainer to prevent rotation of the sewer hose relative to the retainer.

DESCRIPTION OF THE PREFERRED EMBODIMENT

Figures 1, 2:
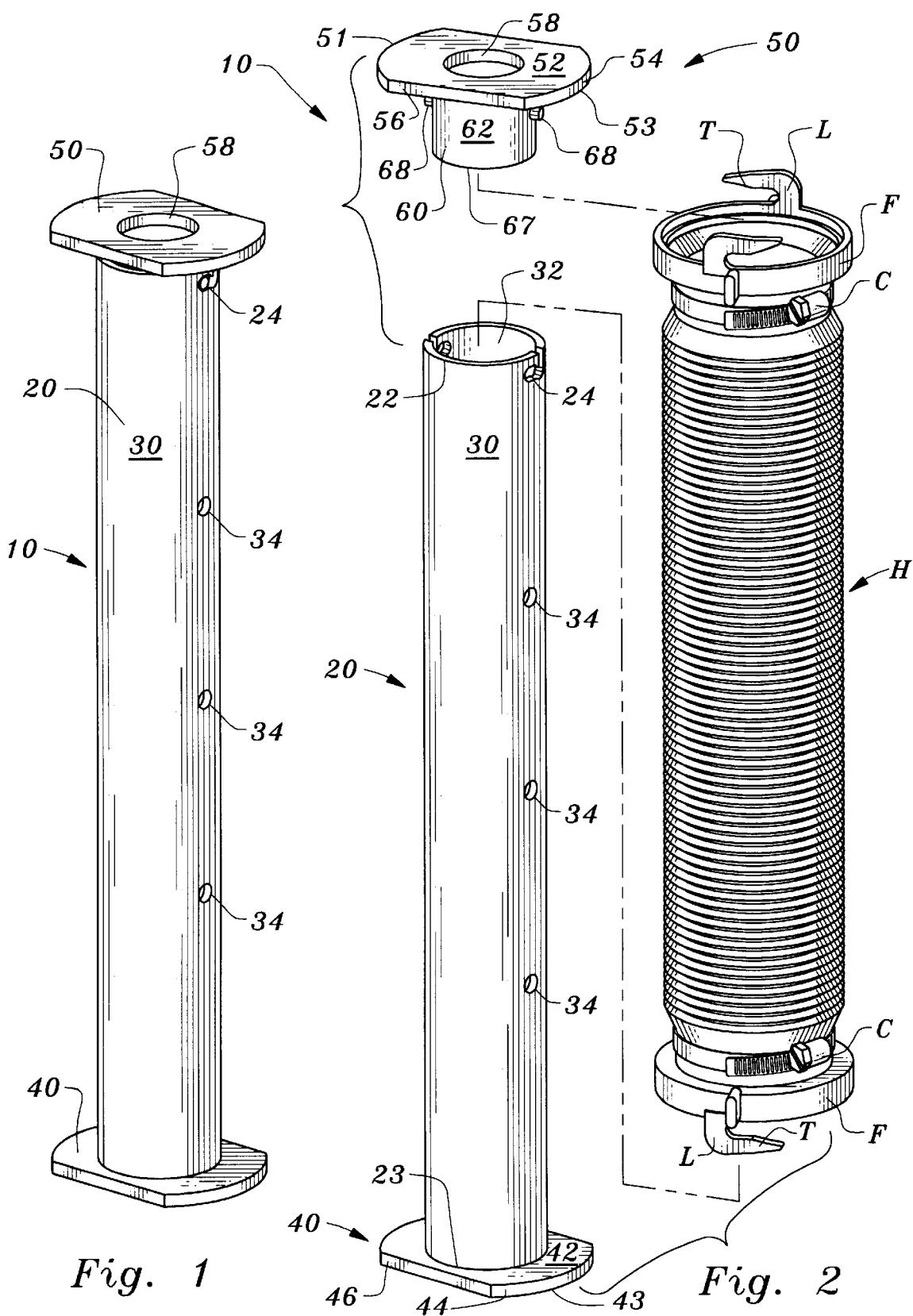
FIG. 1 is a perspective view of the sewer hose retainer of this invention.
FIG. 2 is an exploded perspective view of the sewer hose retainer of this invention revealing how the collapsed sewer hose fits onto the body portion of the retainer and how the cap attaches to the body portion of the retainer.
Figure 7:
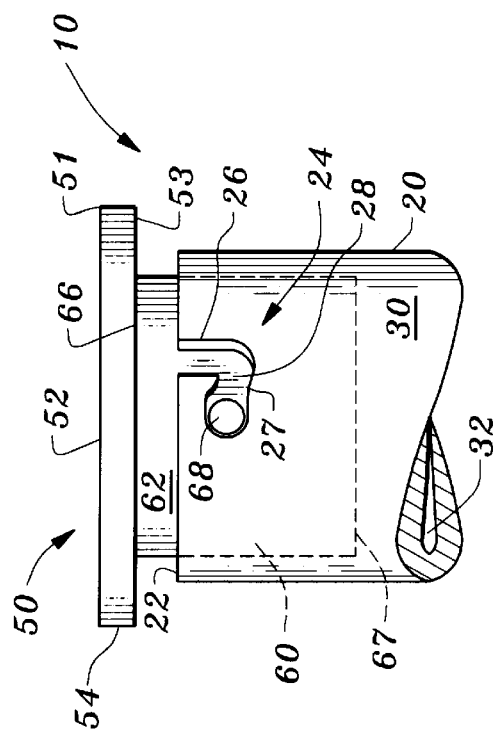
FIG. 7 is a front elevation view similar to that which is shown in FIG. 6 but after the cap of the retainer has been attached to the body portion of the retainer.
Figure 6:
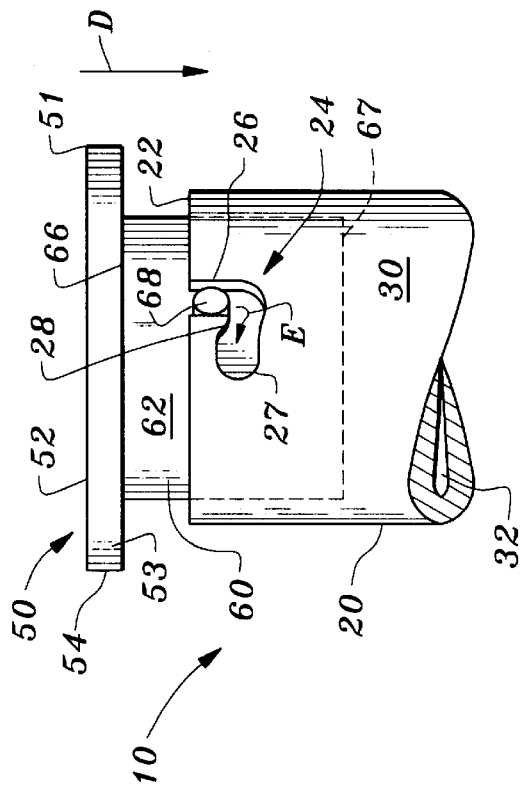
FIG. 6 is a front elevation view of a portion of that which is shown in FIG. 1 revealing initial steps in the attachment of the cap of the retainer to the body portion of the retainer.

Referring to the drawings wherein like reference numerals represent like parts throughout the various drawing figures, reference numeral 10 is directed to a sewer hose retainer (FIG. 1) for holding and supporting a sewer hose H (FIG. 2) in a collapsed configuration when not in use. The retainer 10 facilitates ease in handling the flexible elongatable sewer hose H, facilitates ventilation of an interior of the sewer hose H with a surrounding environment and protects surfaces of the sewer hose H from damage by being kinked or rubbing against abrasive surfaces.

In essence, and with particular reference to FIGS. 1 and 2, the basic configuration of the retainer 10 is provided. The retainer 10 includes an elongate cylindrical body portion 20 extending from a top end 22 to a bottom end 23. An outer cylindrical surface 30 of the body portion 20 has drain holes 34 passing there through and providing access to a hollow interior region 36 of the body portion 20. A base 40 is attached to the bottom end 23 of the body portion 20. The base 40 has a perimeter edge 44 with a sufficient width to prevent the sewer hose H from passing off of the outer cylindrical surface 30 of the body portion 20, past the base 40. A bore 48 (FIG. 8) passes through the base 40 and provides ventilation through the hollow interior region 36 of the body portion 20.

A cap 50 is removably attachable to the top end 22 of the body portion 20. The cap 50 includes an end plate 51 with a perimeter edge 54 having a sufficient width to keep the sewer hose H from passing off of the outer cylindrical surface 30 of the body portion 20 and over the cap 50. The cap 50 also includes a nesting cylinder 60 which can nest inside the hollow interior region 36 of the body portion 20 adjacent the top end 22. The cap 50 includes a bore 58 to provide ventilation into and out of the hollow interior region 36 of the body portion 20.

Notches 24 are provided adjacent the top end 22 of the body portion 20 which coact with posts 68 on the nesting cylinder 60 of the cap 50 to allow the cap 50 to be selectively and securely attached and detached from the body portion 20 of the retainer 10. When the cap 50 is removed from the body portion 20 and the sewer hose H is placed over the outer cylindrical surface 30 of the body portion 20 and the cap 50 is then replaced adjacent the top end 22 of the body portion 20, the sewer hose H is securely held relative to the retainer 10. The sewer hose H is then allowed to be more easily handled and protected, while also being properly ventilated during storage of the sewer hose H.

Figure 8:
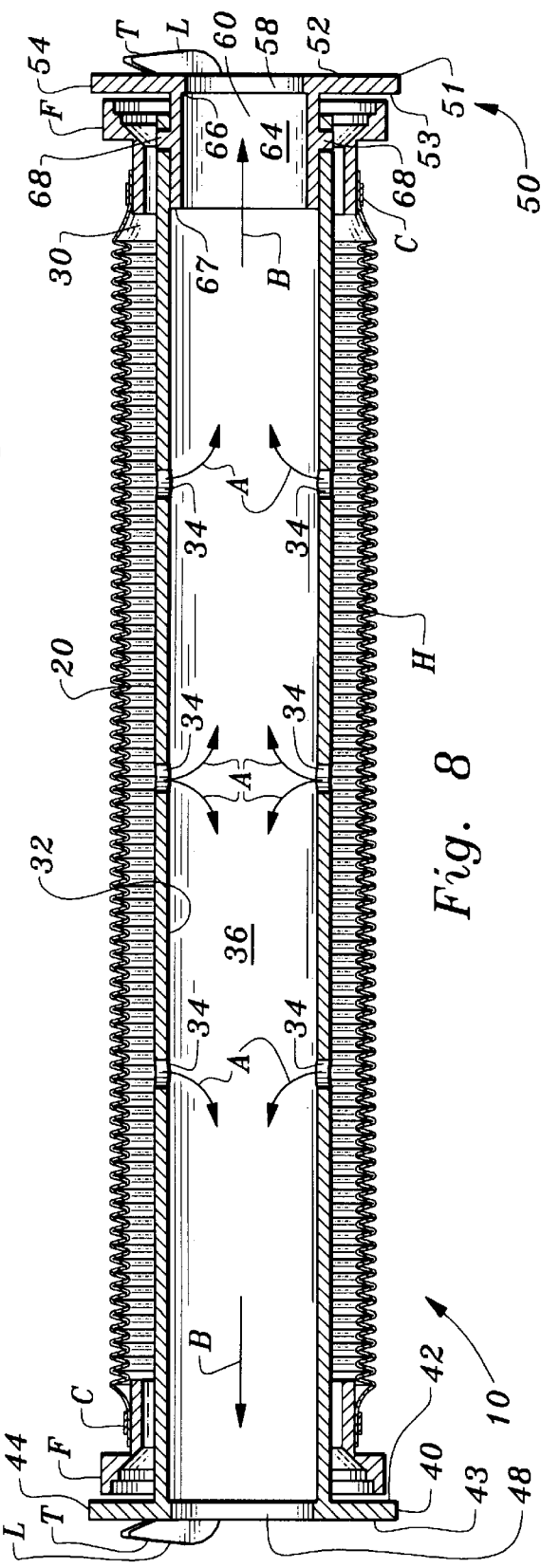
FIG. 8 is a full section view of the sewer hose retainer with the sewer hose in place upon the retainer, revealing how ventilation is provided between an interior of the sewer hose and an interior of the body portion of the retainer, and out to a surrounding environment.

More specifically, and with particular reference to FIGS. 1, 2 and 8, details of the body portion 20 of the retainer 10 are described. The body portion 20 preferably is a rigid hollow cylindrical construct having circular cross section such that the body portion 20 is in the form of a cylindrical tube. The body portion 20 can be formed from a variety of different appropriately rigid materials. Preferably, the body portion 20 is formed from a high density hydrocarbon polymer, such as polyvinyl chloride, having durable, lightweight characteristics and exhibiting ease of manufacture.

The body portion 20 has two flat circular ends including the top end 22 and the bottom end 23. Each end 22, 23 is preferably perpendicular to a long axis of the body portion 20. The top end 22 preferably has two notches 24 formed therein for attachment of the cap 50, as described in detail below. Each notch 24 preferably includes a vertical leg 26 extending substantially perpendicularly down from the top end 22 and a horizontal leg 27 extending substantially parallel to the the top end 22 from an end of the vertical leg 26 opposite the top end 22. The horizontal leg 27 has a length similar to that of the vertical leg 26 so that the horizontal leg 27 stops at a location below the top end 22 of the body portion 20. Preferably, the vertical leg 26 and horizontal leg 27 have a substantially constant width.

However, a neck 28 is provided along the horizontal leg 27 having a slightly lesser width. As discussed below, the neck 28 assists in securing the cap 50 from accidental displacement from the top end 22 of the body portion 20.

The body portion 20 preferably has a substantially constant wall thickness between the outer cylindrical surface 30 and an inner cylindrical surface 32. A series of drain holes 34 pass through the body portion 20 from the outer cylindrical surface 32 to the inner cylindrical surface 32. The drain holes 34 provide for air ventilation between a hollow interior region 36 (FIG. 8) of the body portion 20 and an interior of the sewer hose H to allow the interior of the sewer hose H to thoroughly dry between uses of the sewer hose H. Such air circulation through the drain holes 34 is illustrated with reference to arrow A of FIG. 8. While three drain holes 34 are shown in the preferred embodiment, various different numbers of drain holes 34 could be provided. Alternatively, drain slots of a non-circular form could be provided, drain holes of various different sizes could be provided or the entire body portion 20 of the retainer 10 could be formed from a foraminous structure such as a screen.

With continuing reference to FIGS. 1, 2 and 8, details of the base 40 of the retainer 10 are described. The base 40 provides to the retainer 10 the dual functions of keeping the sewer hose H from passing off of the body portion 20 of the retainer 10 and providing a structure which allows the retainer 10 to stand upon the base 40. The base 40 is plate-like in form with an upper surface 42 adjacent the bottom end 23 of the body portion 20 and a lower surface 43 parallel to and beneath the upper surface 42. The lower surface 43 is preferably flat so that the base 40 can rest upon a flat surface allowing the retainer 10 to stand upon the base 40.

A perimeter edge 44 of the base 40 is preferably substantially circular in form and has a diameter and width which is greater than a width of the outer cylindrical surface 30 of the body portion 20. This perimeter edge 44 also has a width which is greater than a diameter of the sewer hose H. Thus, when the sewer hose H is adjacent to the base 40, the sewer hose H cannot pass over the base 40.

Two clearance zones 46 are formed in the perimeter edge 44 which cause the base 40 to have areas of decreased width. These two clearance zones 46 can cooperate with locking flanges L attached to ends of the sewer hose H. Each locking flange L can pass beyond the base 40 by passing through one of the clearance zones 46. The sewer hose H can then be rotated with respect to the retainer 10 and a tapered tip T of the locking flange L can secure to the base 40 so that the sewer hose H is prevented from rotation relative to the base 40 and retainer 10. When the sewer hose H is prevented from significant rotation relative to the retainer 10, a risk of abrasive damage to the sewer hose H caused by rubbing against the retainer 10 is minimized.

A bore 48 passes through the upper surface 42 and lower surface 43 of the base 40 and allows for air ventilation through the base 40 and into and out of the hollow interior region 36 of the body portion 20, along arrow B (FIG. 8). The bore 48 thus prevents stagnant air from collecting within the hollow interior region 36 of the body portion 20 of the retainer 10.

With particular reference to FIGS. 1, 2, 6 and 7 details of the cap 50 of the retainer 10 are described. The cap 50 includes the end plate 51, which has a configuration similar to that of the base 40, and a nesting cylinder 60. The end plate 51 includes a flat top surface 52 parallel to and spaced from a bottom surface 53. The bottom surface 53 is attached to the nesting cylinder 60 at an upper end 66 of the nesting cylinder 60. The end plate 51 of the cap 50 includes a perimeter edge 54 and clearance zones 56 similar to the perimeter edge 44 and clearance zones 46 of the base 40. The size and configuration of the perimeter edge 54 and clearance zones 56 are similar to those of the perimeter edge 44 and clearance zones 46 of the base 40 and hence will not be belabored. Basically, the perimeter edge 54 prevents the sewer hose H from passing off of the body portion 20 of the retainer 10 when the cap 50 is attached to the body portion 20. The clearance zones 56 allow locking flanges L on the sewer hose H to secure to the end plate 51 of the cap 50 and discourage rotation of the sewer hose H relative to the retainer 10. The end plate 51 of the cap 50 also can temporarily function as a second base upon which the retainer 10 can be supported in a vertical manner.

A bore 58 passes through the end plate 51 and the cap 50 and provides access into an interior of the nesting cylinder 60 and also into the hollow interior region 36 of the body portion 20 when the cap 50 is attached to the body portion 20. The bore 58 thus allows for complete circulation entirely through the hollow interior region 36 (along arrow B of FIG. 8) through both the bore 58 of the cap 50 and the bore 48 of the base 40.

The nesting cylinder 60 of the cap 50 has its upper end 66 securely attached to the bottom surface 53 of the end plate 51. The nesting cylinder 60 extends down from the upper end 66 to a lower end 67. The nesting cylinder 60 includes a substantially cylindrical exterior cylindrical surface 62 with a circular cross-section and an interior cylindrical surface 64 with a circular cross section. The exterior cylindrical surface 62 has a diameter similar to but slightly less than a diameter of the inner cylindrical surface 32 of the body portion 20. Thus, the nesting cylinder 60 can be nested into the hollow interior region 36 of the body portion 20.

Two posts 68 extend radially away from the exterior cylindrical surface 62 of the nesting cylinder 60. Preferably, the posts 68 are formed integrally with the nesting cylinder 60. Alternatively, the posts 68 can be in the form of a rod passing entirely through the nesting cylinder 60 with sufficient length to extend slightly away from the exterior cylindrical surface 62 on opposite sides of the nesting cylinder 60. Each post 68 has a width similar to a width of the notches 24 formed in the body portion 20 and discussed in detail above. The posts 68 are spaced away from the upper end 66 of the nesting cylinder 60 and the end plate 51 by a distance similar to a length of the vertical leg 26 in the notches 24 of the body portion 20. Thus, when the posts 68 pass through the vertical legs 26 in the notches 24 and are then rotated into the horizontal legs 27 of the notches 24 (along arrow E of FIG. 6), the end plate 51 of the cap 50 is located adjacent to the top end 22 of the body portion 20.

The posts 68 are provided with a width which causes a friction fit within the notches 24 at the neck 28. The posts 68 must deflect the neck 28 slightly before passing entirely to an end of the horizontal leg 27 opposite the vertical leg 26. The posts 68 thus can be secured within the notches 24 and will not unintentionally pass out of the notches 24, causing the cap 50 to accidentally fall off of the body portion 20.

In use and operation and with particular reference to FIGS. 2–4 and 6–8, details of the use of the retainer 10 are described. Initially, when the sewer hose H is to be stored for later reuse, the retainer 10 is provided as shown in FIG. 1. The cap 50 is then removed from the body portion 20 by rotating the cap 50 in the direction opposite to that indicated by arrow E (FIG. 6) until the posts 68 pass through the neck 28 in each of the notches 24. The cap 50 can then be removed vertically in a direction opposite to that indicated by arrow D (FIG. 6) until the cap 50 is separated from the body portion 20 (FIG. 2).

The sewer hose H can then be fed onto the body portion 20 until the sewer hose H is entirely upon the body portion 20 with one end of the sewer hose H abutting against the base 40. For convenience, the retainer 10 can be resting with the base 40 parallel to and adjacent a flat horizontal surface so that the body portion 20 is extending vertically up and does not need to be held by the user while the sewer hose H is fed onto the body portion 20. Once the sewer hose H is entirely upon the body portion 20, the cap 50 can be attached to the body portion 20 by lowering the posts 68 down into the vertical legs 26 of the notches 24 (along arrow D of FIG. 6) and then rotating the cap 50 causing the posts 68 to pass through the neck 28 along the horizontal leg 27 (along arrow E of FIG. 6). The cap 50 is then secured in place on the retainer 10 and the sewer hose H is prevented from being displaced from the retainer 10.

To minimize rubbing of the sewer hose H relative to the retainer 10, the sewer hose H can be secured to the base 40 and cap 50 of the retainer 10 as particularly shown in FIGS. 3–5. The sewer hose H can have a variety of different configurations but preferably includes hose fittings F at ends thereof attached by hose clamps C. Each hose fitting F includes two locking flanges L which feature tapered tips T at ends of the locking flanges L. These hose fitting F are provided primarily to allow the sewer hose H to securely connect to holding tanks on a recreational vehicle and municipal sewage systems to which the sewer hose H is to be coupled when in use.

These hose fittings F can optionally be utilized while the sewer hose H is not in use and to prevent the sewer hose H from rubbing abrasively against the retainer 10. The sewer hose H is rotated until the locking flanges L at each end of the sewer hose H are aligned with clearance zones 46, 56 in the base 40 and cap 50. The sewer hose H is then extended slightly allowing the locking flanges L of the hose fittings F to extend beyond the lower surface 43 of the base 40 and the end plate 51 of the cap 50. The sewer hose H is then rotated additionally (along arrow R of FIG. 3) until each locking flange L and tapered tip T extend partially out of the clearance zones 46, 56 (FIG. 5). The sewer hose H is now in a configuration which prevents the sewer hose H from being significantly translated vertically along a central axis of the retainer 10 and which tends to diminish unnecessary rotation of the sewer hose H relative to the retainer 10. Abrasive rubbing between the sewer hose H and retainer 10 is hence minimized. The sewer hose H and retainer 10 can now be handled as a single unit and stored on a recreational vehicle in a variety of different storage locations provided for that purpose.

When the sewer hose H is once again needed for removal of sewage from the recreational vehicle, the sewer hose H and retainer 10 are retrieved from the stored location on the recreational vehicle. The sewer hose H is then rotated until the locking flanges L pass back through the clearance zones 46, 56 and are detached from the base 40 and cap 50. The retainer 10 can then be placed upon a vertical surface and resting upon the base 40. The cap 50 is then grasped and rotated as discussed above for removal of the cap 50 from the body portion 20 of the retainer 10. Once the cap 50 has been removed from the body portion 20, the sewer hose H can be fed off of the body portion 20 and attached to the recreational vehicle and a municipal sewer system as needed. The cap 50 can then be reattached to the body portion 20 and the retainer 10 stored until again needed for storage of the sewer hose H.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure.

What is claimed is:

1. A combination of a retainer and a flexible elongate recreational vehicle sewer hose supported by the retainer, the retainer comprising:

a substantially rigid elongate hollow tube having a first end and a second end opposite said first end, said tube having a width less than a width of an interior of the sewer hose, such that the sewer hose can be placed over said tube;

a base attached to said first end of said tube, said base having a width greater than a width of the sewer hose, such that the sewer hose cannot pass over said base;

a cap, said cap including means to be removably attached to said second end of said tube, said cap having a width greater than a width of the sewer hose, such that the sewer hose cannot pass over said cap when said cap is attached to said tube; and said tube having at least one hole passing from an outer surface to a hollow interior of said tube.

2. The combination of claim 1 wherein said interior of said hollow tube is vented to a surrounding environment in a manner other than through said hole, such that the interior of the sewer hose and said interior of said hollow tube can have air circulation with a surrounding environment.

3. The combination of claim 2 wherein said base includes a bore passing there through providing a passageway between said interior of said hollow tube and a surrounding environment.

4. The combination of claim 3 wherein said cap includes a bore passing there through such that said hollow interior of said tube is in fluid communication with a surrounding environment through said bore in said cap.

5. The combination of claim 1 wherein said tube is cylindrical in form with a circular cross-section.

6. The combination of claim 1 wherein said tube has a length between said first end and said second end greater than a length of the sewer hose when the sewer hose is collapsed to a minimum.

7. The combination of claim 1 wherein said base includes a flat lower surface, such that said retainer can stand on said base with said tube extending up from said base.

8. The combination of claim 1 wherein said cap includes an end plate having a width greater than the width of the sewer hose and a nesting cylinder extending from said end plate, said nesting cylinder having a width less than a width of said hollow interior of said tube, such that said nesting cylinder of said cap can be oriented within said hollow interior of said tube adjacent said second end of said tube.

9. The combination of claim 8 wherein said cap includes at least one post extending radially away from said nesting cylinder and wherein said tube includes at least one notch adjacent said second end of said tube, said notch having a width at least as great as a width of said post in said cap such that said post in said cap can pass through said notch, said notch and said post including means to secure to each other in a removable fashion, such that said cap can be secured to said tube.

10. The combination of claim 9 wherein said notch includes a vertical leg substantially perpendicular to said second end of said tube and a horizontal leg extending substantially parallel to said second end of said tube and connected to said vertical leg at an end of said vertical leg opposite said second end, said horizontal leg including a neck therein having a width causing said neck to have a friction fit with said post, said vertical leg having a length similar to a distance between said end plate of said cap and said post, such that when said post is threaded down through said vertical leg of said notch and then said cap is rotated so that said post passes through said horizontal leg of said notch and through said neck, said end plate is substantially adjacent to said second end of said tube.

11. The combination of claim 10 wherein said end plate in said cap includes a perimeter edge which has a maximum width greater than a width of the sewer hose and at least two clearance zones on opposite sides of said perimeter edge, said clearance zones having a width spaced from each other less than a width of said sewer hose, the sewer hose having at least two locking flanges attached thereto which can pass beyond said end plate through said clearance zones and secure to said end plate of said cap when the sewer hose is rotated with respect to said retainer, such that said retainer can hold the sewer hose in a secure manner relative to said retainer.

12. A combination of a retainer and a hose, the hose being an elongate flexible and extensible hollow tube supported by the retainer, said retainer comprising:

an elongate body portion having a maximum width less than the diameter of the hose and a length greater than a minimum compressed length of the hose, such that the hose can be located entirely upon said elongate body portion with said elongate body portion passing through an interior of the hose;

a base on said body portion having a width greater than a width of the hose, such that the hose cannot pass over said base; and a cap, said cap including means to be removably attached to said body portion at a location spaced from said base a distance greater than a minimum compressed length of the hose, said cap having a width greater than the width of the hose, such that the hose cannot pass over said cap when the hose is on said body portion and said cap is attached to said body portion.

13. The combination of claim 12 wherein said elongate body portion is a hollow tube with an interior and holes passing through a wall of said body portion and into said interior.

14. The combination of claim 13 wherein said cap has a vent opening passing there through such that said hollow interior of said body portion of said retainer is in fluid communication with air surrounding said retainer.

15. The combination of claim 14 wherein said base has a vent opening passing there through such that said hollow interior of said body portion of said retainer is in fluid communication with air surrounding said retainer through both said base and said cap and air can flow entirely through said hollow interior of said body portion of said retainer.

16. The combination of claim 15 wherein said body portion of said retainer is substantially linear and said base includes a flat lower surface perpendicular to said body portion, such that said retainer can stand on said flat lower surface of said base.

17. The combination of claim 16 wherein said cap includes a nesting cylinder portion with a width less than a width of said hollow interior of said body portion of said retainer such that said nesting cylinder can nest within said hollow interior of said body portion of said retainer, said cap further including an end plate having a width greater than the width of the hose, said body portion having a notch formed therein at an end of said body portion adjacent said cap, said cap including a post extending from said nesting cylinder sized to pass within said notch in said body portion, said post and said notch configured to latch together securing said cap to said body portion in a removable fashion.

18. A method of storing an elongate flexible and extensible recreational vehicle sewer hose on board the recreational vehicle in a manner which minimizes damage to the sewer hose and inconvenience to the operator, the method including the steps of:

providing a retainer and the recreational vehicle sewer hose including a rigid elongate hollow tube having a first end and a second end, the tube having a width less than a width of an interior of the sewer hose, such that the sewer hose can be placed over the tube;

a base attached to the first end of the tube, the base having a width greater than the width of the sewer hose, such that the sewer hose cannot pass over the base;

a cap, the cap including means to be removably attached to the second end of the tube, the cap having a width greater than the width of the sewer hose, such that the sewer hose cannot pass over the cap when the cap is attached to the tube;

removing the cap from the tube;

feeding the sewer hose onto the tube;

securing the cap to the tube; and placing the retainer and the sewer hose which is located upon the retainer in a storage region on the recreational vehicle.

19. The method of claim 18 including the further step of providing vent holes passing through the tube of the retainer and through the base of the retainer and the cap of the retainer such that an interior of the sewer hose is vented and circulation with surrounding air is provided through the tube of the retainer.

20. The method of claim 19 including the further step of attaching ends of the sewer hose to the base and to the cap of the retainer in a manner preventing rotation of the sewer hose relative to the retainer, such that damage to the sewer hose from rubbing against the retainer or other structures within the storage region on the recreational vehicle is minimized.

* * * * *